(12) United States Patent
Tseng

(10) Patent No.: US 6,246,792 B1
(45) Date of Patent: Jun. 12, 2001

(54) METHOD FOR IMPROVEMENT OF DIGITIZED IMAGES

(76) Inventor: Shou-Min Tseng, No. 32 Jin-Men-Shin-Cheng, Bade City, Taoyuan Hsien (TW), 334

( * ) Notice: Subject to any disclaimer, the term of this patent is extended or adjusted under 35 U.S.C. 154(b) by 0 days.

(21) Appl. No.: 09/190,244

(22) Filed: Nov. 13, 1998

(51) Int. Cl.$^7$ ........................................ G06K 9/00
(52) U.S. Cl. .......................... 382/167; 358/518; 358/521
(58) Field of Search ........................ 382/162, 163, 382/167; 358/518, 504, 520, 521, 139, 534, 448, 515; 345/153, 154, 199; 348/671

(56) References Cited

U.S. PATENT DOCUMENTS

| | | | | |
|---|---|---|---|---|
| 4,953,008 | * | 8/1990 | Kaye | 348/577 |
| 5,371,615 | * | 12/1994 | Eschbach | 358/515 |
| 5,398,124 | * | 3/1995 | Hirota | 358/530 |
| 5,850,472 | * | 12/1998 | Alston et al. | 382/162 |
| 6,069,973 | * | 5/2000 | Lin et al. | 382/167 |

* cited by examiner

Primary Examiner—Amelia M. Au
Assistant Examiner—Danny Do
(74) Attorney, Agent, or Firm—Bacon & Thomas, PLLC

(57) ABSTRACT

According to a method for improving digital images, an input image is digitized and represented by pixels, each pixel including three original color components represented by gray level values. The average gray level value for a first color is calculated to obtain a first color adjustment factor. A second color adjustment factor and a third color adjustment factor are calculated based on the first color adjustment factor, and the gray level values for the second color and the third color of all pixels are adjusted accordingly to obtain an image with emphasized first color components.

5 Claims, 1 Drawing Sheet

METHOD FOR IMPROVEMENT OF DIGITIZED IMAGES

FIELD OF INVENTION

Figure 1:
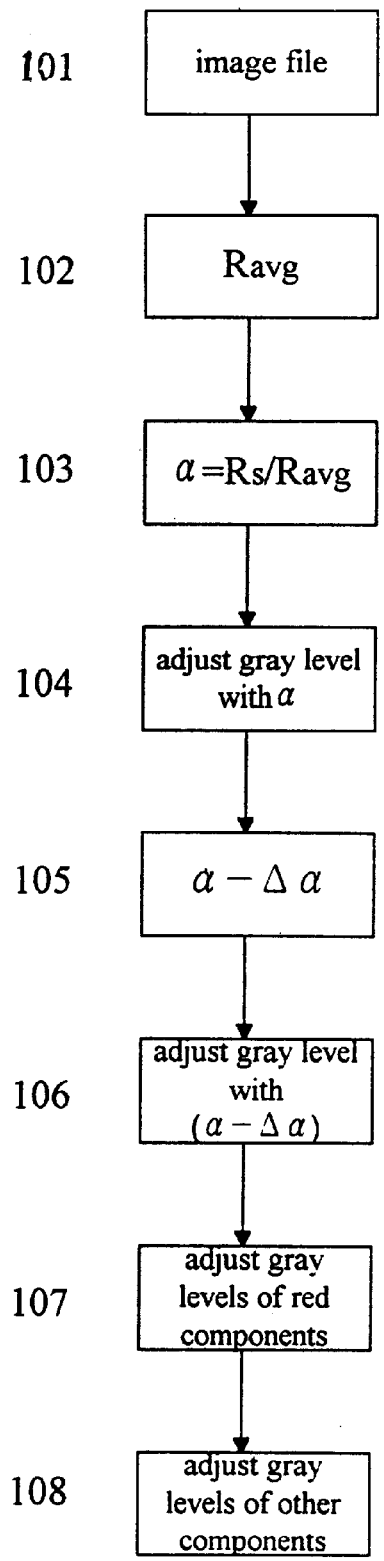

The present invention relates to a method for the improvement of digitized images and especially to a method to improving the components of a single color for a colored image.

BACKGROUND OF INVENTION

Due to the tremendous progress and wide application of computerized image processing technology, many images may be processed by a computer and used in a variety of applications. These applications include storage, transmission, replay, recognition, matching and creation of images.

In most applications, images to be processed are input into a computer by an input device and stored in the memory device of the computer. Applicable input devices include analog cameras, digital cameras and planar scanners. No matter what the input device is, an input image is transformed into a digitized format before it is stored. In most cases, the input image is divided into pixels, each comprising three original color components. Each original color components are represented by a gray level value which stands for the brightness of the respective color component of the pixel. Although an image so processed will be distorted, such format is satisfactory to most applications of images. In general, the brightness of a color component is divided into 256 levels and represented by 0 to 255 where greater values indicate darker pixels and smaller values indicate brighter pixels.

In some applications of image processing, it is necessary to emphasize a particular color. These applications include recognition of images, diagnosis of diseases. identification of seal prints and signatures. In these applications, it is necessary to preprocess the input image in order to filter out noise contained in the image and to purify the image. Especially when the input image is a true color image, its components of a particular color may include influences from other colors, due to poor illumination conditions. Purification of colored image has thus become an important task in these applications.

Although many technologies have been invented to improve the quality of color images, most of the technologies are aimed at the improvement of all color components. Very few of them may be applied to improve the quality of a single color of a colored image.

There is thus a need to provide a novel method for the improvement of digitized images that is capable to of emphasizing components of a single color of a colored image.

There is also a need to provide a novel method for the improvement of digitized images to purify the components of a single color of the colored image.

There is also a need to provide a device to improve digitized images according to the above methods.

OBJECTIVES OF INVENTION

The objective of this invention is to provide a novel method for the improvement of digitized images.

Another objective of this invention is to provide a method to improve digitized images that is capable of emphasizing components of a single color of a colored image.

Another objective of this invention is to provide a novel method for the improvement of digitized images to purify the components of a single color of a colored image.

Another objective of this invention is to provide a device to improve digitized images according to the above methods.

SUMMARY OF INVENTION

According to the present invention, a novel method for improvement of digitized images is disclosed. An input image is digitized and represented by pixels wherein each pixel comprises three original color components represented by gray level values of each original color. The average of gray level values for a first color is calculated to obtain a first color adjustment factor. The first color gray level values of all pixels are adjusted by said first color adjustment factor. A second color adjustment factor and a third color adjustment factor are calculated according to said first color adjustment factor. The gray level values for the second color and the third color of all pixels are adjusted accordingly. An image with emphasized first color components is obtained.

The above and other objectives and advantages of this invention may be easily understood from the detailed description by referring to the following drawing.

IN THE DRAWING

FIG. 1 illustrates the flow chart of the method for improvement of digitized images of this invention.

DETAILED DESCRIPTION OF THE INVENTION

The method for improvement of digitized images of this invention is capable of purifying or emphasizing the components of a single color of a colored image. Such function may be used in applications including recognition of images, diagnosis of diseases, identification of seal prints and signatures. In order to illustrate the present invention, the following description will be given, taking the identification of seal prints as an example.

The seal or chop is a useful tool for the identification of a person in the Chinese and the Japanese societies. A seal always contains a frame and several characters inside the frame. The characters represent the name of a person or other expressions. Sometimes the characters are printed positively and sometimes reversed. A seal print is attached to a document after the document is prepared, so as to make it a formal one. In many cases, the seal print is deemed equal to or more important than the signature of a person. When a seal is printed on a document, the color of the seal print is always red or pink. Most documents are not written or printed in red color. Therefore, the seal print or prints on a document are obvious to readers of the document.

A seal print in a document may be used to identify whether the document is made by the person represented by the seal. When there is a doubt, the holder of the seal will be asked to make a seal print with the seal concerned. The two seal prints will be compared and, when they are matched, the document will be deemed genuine.

An automatic matching device for seal prints is desirable in locations where a large quantity of seal prints shall be identified. Take the bank as an example. When a customer of a bank opens a savings account in the bank, the customer is required to register a sample seal print at the bank. When the customer withdraws money from the account, he will be required to print the same seal on the notice of withdrawal.

A teller of the bank will then compare the seal print with the sample seal print and decide whether the two seal prints are identical (or are from the same seal). When they are determined to be identical or matched, the customer will be allowed to withdraw the money.

Two kinds of automatic matching devices for seal prints have been developed and provided to help the bank tellers to match seal prints:

Semi-automatic identification device: The sample seal prints are stored in the identification device. When a seal print is to be matched, its corresponding sample seal print is retrieved and its image is displayed on a monitor. An image capture device is used to capture the image of the seal print to be identified. The captured image is also displayed on the monitor, in a different color. The teller adjusts the position of the seal print to be identified such that two images overlap. Differences between the two images are identified and the teller decides whether they are identical according to the characters of the differences.

Automatic identification device: When seal prints are being identified automatically, it is always not necessary to compare the whole images. The sample seal prints are stored in the identification device with their feature points. When a seal print is to be identified, its image is captured by an image capture device and its feature points are abstracted. The feature points of the seal print to be identified are then compared with that of its corresponding sample seal print. An algorithm is used to decide the similarity of the two seal prints. When the similarity value is greater than a threshold, the two seal prints are considered identical or matched.

In either case, it is necessary to obtain images of high quality, when the sample seal print or the seal print to be identified is captured. More particular, a critical requirement of the quality of the captured image is that the red components of the seal print shall be pure such that influences from other color components shall be reduced as much as possible. Otherwise, the result of the identification will be incorrect.

In order to purify or to emphasize the red components of an image, features of images such as a seal print are employed in the method for improvement of digitized images of this invention. FIG. 1 illustrates the flow chart of the method for improvement of digitized images of this invention. As shown in this figure, at 101 a digitized, full-color image is obtained. In general cases, the image is divided into pixels at the resolution of 300 dots per inch (dpi). Each pixel comprises three original color components (e.g., red, blue and green). Each original color component of a pixel is represented by a gray level value which stands for the brightness of the respective color component of the pixel. In general, the brightness of a color component is divided into 256 levels and represented by 0 to 255 where greater values indicate darker pixels and smaller values indicate brighter pixels. In other words, a pixel with gray level values (255, 255, 255) represents a white point and a pixel with gray level values (0, 0, 0) represents a black point. While the image is a seal print, it is always printed on a piece of paper. Since the paper is a document, the obtained image contains characters printed or written in blue or black color and seal print(s) in red color. In the identification of the obtained seal print, it is necessary to emphasize the red color components of the obtain seal print so that the seal print may be abstracted for further processes.

At 102 the average gray level value of the red components of all the pixels ($R_{avg}$) is calculated. In the calculation of $R_{avg}$, any software and/or hardware may be used. For example, a digital signal process may be used to cumulate the gray level values of the red components of all pixels and divide the sum by the number of the pixels. In order to save processing time, it is possible to select a block of the image to calculate the average gray level value of the red components of the block image. When this approach is used, it is recommendable to select a block with higher average red gray level.

At 103 a constant $R_s$ is used to calculate an adjustment factor ($\alpha$), $\alpha = R_s/R_{avg}$. In general cases, $R_s$ is greater than $R_{avg}$. Constant $R_s$ may be determined by statistical analysis of a certain number of seal prints. In the embodiment of this invention, the value of $R_s$ is set to 200. Of course, higher or lower values for $R_s$ may be used, depending on the purposes and requirements of the application.

At 104 the gray level values of the red components of all pixels are adjusted by $\alpha$. As $R_{avg}$ is greater than $R_s$ in most cases, the value of $\alpha$ will be greater than 1. The red components of the image will thus be emphasized.

At 105 constant $\alpha$ is substrated from the value a constant $\Delta\alpha$. The value of constant $\Delta\alpha$ may be decided according to purposes and requirements of the application. When a seal print on white paper is obtained, its average red gray level is about 160. If $R_s$ is 200, $\alpha=200/160=1.25$. Under such circumstance, $\Delta\alpha$ may be 0.3 such that $\alpha-\Delta\alpha=0.95$. At 106 all gray level values of the blue components and the green components of all pixels are adjusted by ($\alpha-\Delta\alpha$). While ($\alpha-\Delta\alpha$)=0.95, the gray level values of the blue components and the green components of the image will be reduced. As a result, the red components of the image will be brighter, if compared with the original image. In some embodiments of this invention, $\Delta\alpha$ may be decided dynamically.

In some embodiments of this invention, the blue components and the green components of the image are not adjusted by ($\alpha-\Delta\alpha$).

When the application is the identification of seal prints, further processes may be taken. At 107 the gray level values of red components are changed to 255, for pixels where the gray level values of red components are greater than a threshold, and are changed to 0 for other pixels. At 108 the gray level values of the blue components and the green components of all pixels are changed to 0. As a result, an emphasized, red colored image is obtained. In most cases, the obtained image is the captured seal print as such. In this embodiment, the threshold used to change the gray level values may be 180.

In some embodiments of this invention, a threshold for red color, a threshold for blue color and a threshold for green color are used to process the image, as follows:

For all pixels P, if $[R(p)-G(p)]+[R(p)-B(p)]>\Delta G+\Delta B$ and $G(p)<G_T$, and $B(p)<B_T$ then output 1; Otherwise output 0.

In this embodiment R(p), G(p) and B(p) represent the gray level values of the red, green and blue components of a pixel P, respectively; $\Delta G$ and $\Delta B$ are constants and, in some embodiments, $\Delta G=R_T-G_T$ and $\Delta B=R_T-B_T$; $R_T$, $B_T$ and $G_T$ represent threshold for red, blue and green colors, respectively.

In this embodiment, $R_T=180$, $B_T=G_T=140$.

After this process, pixels represented by "1" are red pixels and pixels represented by "0" are background (blank or black). A red image with high quality is thus obtained.

The invented method may be processed in a personal computer. It may also be performed with a particular designed circuit.

The method for improvement of digitized images of this invention may not only be used to emphasize the red components of an image, it may also be used to emphasize the blue, green components or any combination of the original colors, of an image.

As the present invention has been shown and described with reference to preferred embodiments thereof, those skilled in the art will recognize that the above and other changes may be made therein without departing from the spirit and scope of the invention.

What is claimed is:

1. A method for processing a digitized image, comprising the following steps:

obtaining a colored image comprising pixels, each pixel including respective first, second, and third original color components A(p), B(p), and C(p), each of said first, second, and third color components being represented by a gray level;

calculating an average value ($A_{avg}$) of gray levels for said first original color component for pixels of at least a selected portion of said colored image;

obtaining an adjustment factor $\alpha$, wherein $\alpha A_s/A_{avg}$ and wherein $A_s$ is a predetermined adjustment constant; and adjusting said gray levels of said first original color component for all pixels of said image by said adjustment factor $\alpha$, and further comprising the step of converting said colored image into a monochromic image, wherein said conversion comprises processing all pixels of said colored image by the following steps:

calculating a difference in gray levels between said first and second original color components (A(p)−B(p)) and a difference in gray levels between said first and third original color components (A(p)−C(p)) for each pixel;

calculating a sum of (A(p)−B(p)) and (A(p)−C(p)), comparing said sum with a sum of a threshold ($\Delta B$) for said second color component and a threshold ($\Delta C$) for said third color component; and changing each respective pixel into "1" if (A(p)−B(p))+(A(p)−C(p))>$\Delta B$+$\Delta C$, if B(p)<$B_T$, and if C(p)<$C_T$ or, otherwise, into "0".

2. The method according to claim 1, further comprising a step to adjust by ($\alpha$−$\Delta\alpha$) the gray levels of the second original color component and the gray levels of the third original color component, for all pixels, after adjusting the gray levels of said first original color component; wherein $\Delta\alpha$ is a predetermined value.

3. The method according to claim 1 wherein $A_s$=200.

4. The method according to claim 1 wherein $\Delta B$=$\Delta C$=40.

5. The method according to claim 2 wherein $\Delta\alpha$=0.3.

* * * * *